United States Patent
Davis

(10) Patent No.: US 12,447,697 B2
(45) Date of Patent: Oct. 21, 2025

(54) FORMING DUCT STRUCTURE WITH OVERBRAIDED WOVEN FIBER SLEEVE

(71) Applicant: Rohr, Inc., Chula Vista, CA (US)

(72) Inventor: Jennifer Davis, Carlsbad, CA (US)

(73) Assignee: Rohr, Inc., Chula Vista, CA (US)

( * ) Notice: Subject to any disclaimer, the term of this patent is extended or adjusted under 35 U.S.C. 154(b) by 211 days.

(21) Appl. No.: 18/076,014

(22) Filed: Dec. 6, 2022

(65) Prior Publication Data

US 2024/0181722 A1 Jun. 6, 2024

(51) Int. Cl.
- *B29C 70/48* (2006.01)
- *B29C 70/34* (2006.01)
- *F16L 9/133* (2006.01)
- *F16L 9/19* (2006.01)
- *B29K 307/04* (2006.01)
- *B29L 23/00* (2006.01)

(52) U.S. Cl.
CPC ............ *B29C 70/345* (2013.01); *F16L 9/133* (2013.01); *F16L 9/20* (2013.01); *B29K 2307/04* (2013.01); *B29K 2313/00* (2013.01); *B29L 2023/004* (2013.01)

(58) Field of Classification Search
CPC ... B29C 70/345; B29C 70/446; B29C 70/462; B29C 70/48
See application file for complete search history.

(56) References Cited

U.S. PATENT DOCUMENTS

| | | | | |
|---|---|---|---|---|
| 3,920,049 A | * | 11/1975 | Lippert | F16L 9/133 138/109 |
| 5,202,070 A | * | 4/1993 | Schneider | B29C 70/30 264/137 |
| 8,263,200 B2 | | 9/2012 | Barber | |
| 8,951,375 B2 | | 2/2015 | Havens | |
| 9,073,240 B2 | | 7/2015 | Huelskamp | |
| 9,279,531 B2 | | 3/2016 | Parkin | |
| 9,469,390 B2 | | 10/2016 | Kowal | |
| 11,091,847 B2 | | 8/2021 | Yang | |
| 2020/0049181 A1 | * | 2/2020 | Pethick | B29C 57/00 |
| 2020/0049282 A1 | * | 2/2020 | Giannakopoulos | B29C 70/222 |

FOREIGN PATENT DOCUMENTS

| | | |
|---|---|---|
| DE | 4014400 A1 | 11/1991 |
| JP | H03161326 A | 7/1991 |

OTHER PUBLICATIONS

EP Search Report for EP Patent Application 23214339.6 dated May 7, 2024.

* cited by examiner

*Primary Examiner* — Matthew J Daniels
(74) *Attorney, Agent, or Firm* — Getz Balich LLC

(57) ABSTRACT

A method is provided for manufacturing. During this method, a woven fiber sleeve is disposed over a mandrel to provide an overbraided mandrel. The woven fiber sleeve includes a base section and a mount section. The base section is wrapped circumferentially around the mandrel and extends longitudinally along the mandrel between a first end and a second end. The mount section is disposed longitudinally at an intermediate location between the first end and the second end. The mount section projects out from the base section. The overbraided mandrel is arranged with tooling. A polymer material is disposed with the woven fiber sleeve to provide a duct structure. The duct structure includes a tubular duct and an annular flange. The tubular duct is formed by the base section. The annular flange is formed by the mount section.

15 Claims, 12 Drawing Sheets

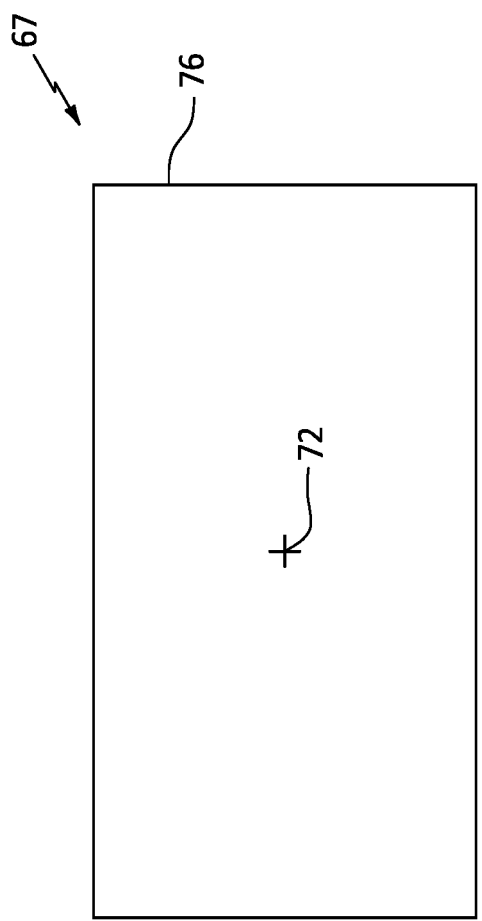
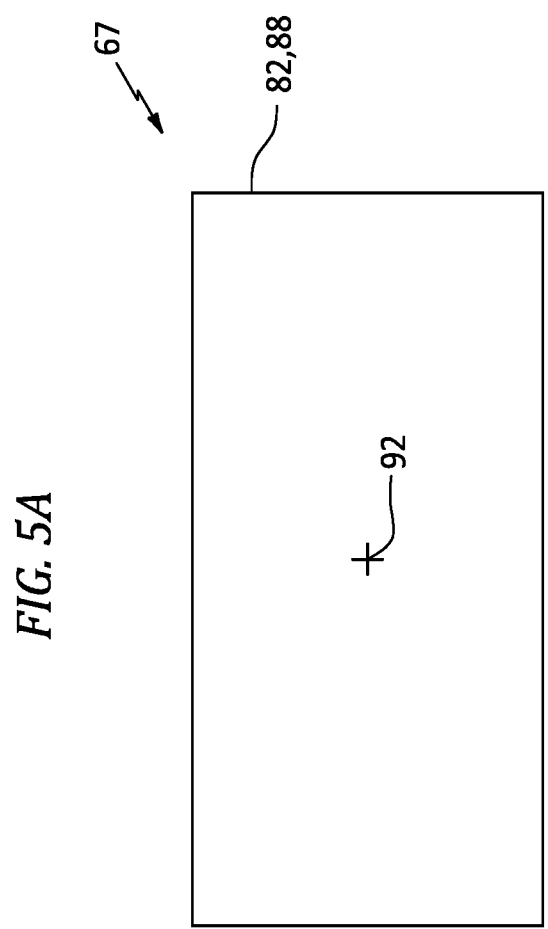
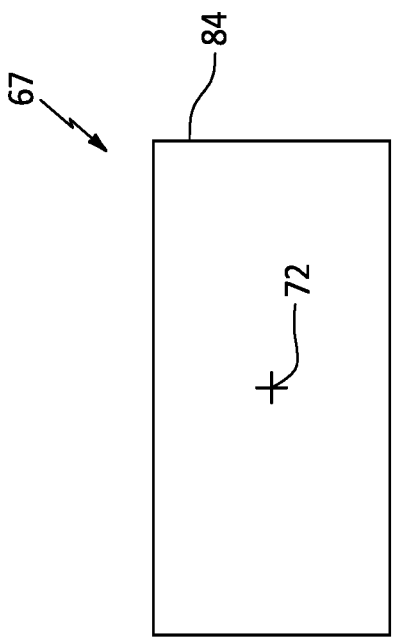
FIG. 5A
FIG. 5B
FIG. 5C

FORMING DUCT STRUCTURE WITH OVERBRAIDED WOVEN FIBER SLEEVE

BACKGROUND

1. Technical Field

This disclosure relates generally to manufacturing a fiber-reinforced composite duct structure.

2. Background Information

An aircraft propulsion system may include a duct structure for delivering air to an engine such as a turboprop gas turbine engine. The duct structure may also include a bypass duct. Various types of duct structures and methods for forming those duct structures are known in the art. While these known duct structures and methods for forming duct structures have various benefits, there is still room in the art for improvement.

SUMMARY OF THE DISCLOSURE

According to an aspect of the present disclosure, a method is provided for manufacturing. During this method, a woven fiber sleeve is disposed over a mandrel to provide an overbraided mandrel. The woven fiber sleeve includes a base section and a mount section. The base section is wrapped circumferentially around the mandrel and extends longitudinally along the mandrel between a first end and a second end. The mount section is disposed longitudinally at an intermediate location between the first end and the second end. The mount section projects out from the base section. The overbraided mandrel is arranged with tooling. A polymer material is disposed with the woven fiber sleeve to provide a duct structure. The duct structure includes a tubular duct and an annular flange. The tubular duct is formed by the base section. The annular flange is formed by the mount section.

According to another aspect of the present disclosure, another method is provided for manufacturing. During this method, a woven fiber sleeve is disposed over a mandrel to provide an overbraided mandrel. The woven fiber sleeve includes a base section and a mount section. The base section is wrapped circumferentially around the mandrel and extends longitudinally along the mandrel between a first end and a second end. The mount section is disposed at the first end. The woven fiber sleeve is splayed out to form the mount section. The overbraided mandrel is arranged with tooling. A polymer material is disposed with the woven fiber sleeve to provide a duct structure. The duct structure includes a tubular duct and an annular flange. The tubular duct is formed by the base section. The annular flange is formed by the mount section.

According to still another aspect of the present disclosure, another method is provided for manufacturing. During this method, a woven fiber sleeve is slipped over a mandrel. A portion of the woven fiber sleeve is manipulated to provide the woven fiber sleeve with a base section and a mount section. The base section is wrapped circumferentially around the mandrel and extends longitudinally along the mandrel between a first end and a second end. The mount section projects out from the base section. A polymer material is infused into the woven fiber sleeve to provide a duct structure. The duct structure includes a tubular duct and an annular flange. The tubular duct is formed by the base section. The annular flange is formed by the mount section.

Fibers within the woven fiber sleeve may be splayed, without cutting the woven fiber sleeve, to form the mount section.

The woven fiber sleeve may also include an intermediate mount section. The intermediate mount section may be disposed longitudinally at an intermediate location between the first end and the second end. The intermediate mount section may project out from the base section. The duct structure may also include an intermediate flange formed by the intermediate mount section.

A flowpath may extend longitudinally within the duct structure between the first end and the second end. The annular flange may circumscribe a port. The port may be arranged to a side of and may be fluidly coupled with the flowpath.

The tooling may include an annular insert. The annular insert may circumscribe a first portion of the mount section. The annular insert may be disposed between a second portion of the mount section and the base section.

The first portion of the mount section may form a port into the duct structure. The second portion of the mount section may form the annular flange. The annular flange may circumscribe the port.

The annular insert may have a cross-sectional geometry that tapers as the annular insert extends towards the first portion of the mount section.

The tooling may include an exterior mold. The overbraided mandrel may be disposed within a cavity of the exterior mold.

The woven fiber sleeve may also include a first end mount section disposed longitudinally at the first end. The first end mount section may project out from the base section. The duct structure may also include an annular first end flange formed by the first end mount section.

The woven fiber sleeve may be flared out to provide the end mount section.

The woven fiber sleeve may also include a second end mount section disposed longitudinally at the second end. The second end mount section may project out from the base section. The duct structure may also include an annular second end flange formed by the second end mount section.

The woven fiber sleeve may be configured from or otherwise include carbon fiber.

The polymer material may be or otherwise include thermoplastic material.

The polymer material may be or otherwise include thermoset material.

The mandrel may be configured from or otherwise include thermoplastic material.

The duct structure may be configured for an aircraft propulsion system.

The tubular duct may be configured as or otherwise include a transition duct. The duct structure may also include an inlet duct and a bypass duct. The transition duct may include an inlet, a first outlet and a second outlet. The transition duct may extend longitudinally along a longitudinal centerline from the inlet to the second outlet. The first outlet may be arranged longitudinally along the longitudinal centerline between the inlet and the second outlet and may be circumscribed by the annular flange. The inlet duct may extend longitudinally along the longitudinal centerline to the inlet. The bypass duct may extend longitudinally along the longitudinal centerline from the second outlet.

A centerline axis of the first outlet may be angularly offset from the longitudinal centerline.

The duct structure may be configured in a monolithic body.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A-C are schematic cross-sectional illustrations of various orifices of a transition duct.

DETAILED DESCRIPTION

The present disclosure includes methods for manufacturing a duct structure from fiber-reinforced composite material. This duct structure may be configured for an aircraft such as an airplane or another manned or unmanned aerial vehicle. The duct structure, for example, may be configured for a propulsion system of the aircraft. The present disclosure, however, is not limited to such an exemplary aircraft application. The duct structure, for example, may alternatively be configured for use in a part or system of the aircraft outside of (or in combination with) the aircraft propulsion system. Furthermore, the duct structure is not limited to aircraft applications in general. The duct structure, for example, may be configured for any application which would benefit from use of a (e.g., monolithic) fiber-reinforced composite duct structure manufactured as described below. However, for ease of description, the duct structure may be described with respect to an aircraft propulsion system.

Figure 1:
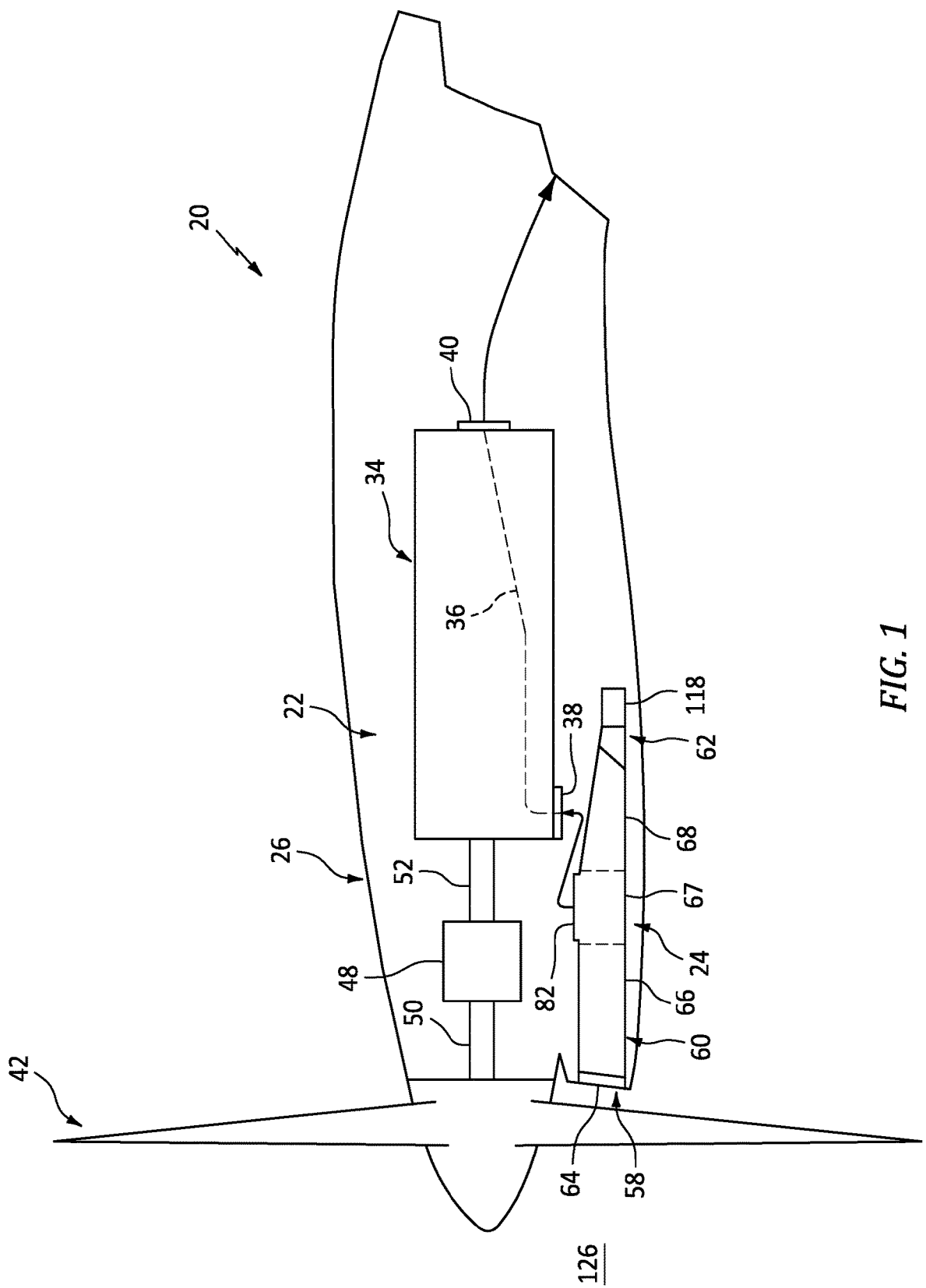
FIG. 1 is a side schematic illustration of an aircraft propulsion system.

FIG. 1 illustrates an exemplary aircraft propulsion system 20. This aircraft propulsion system 20 includes an engine 22 and a duct assembly 24. The aircraft propulsion system 20 also include a nacelle 26 configured to at least partially (or completely) house and provide an aerodynamic cover for the engine 22 and/or the duct assembly 24.

Figure 2:
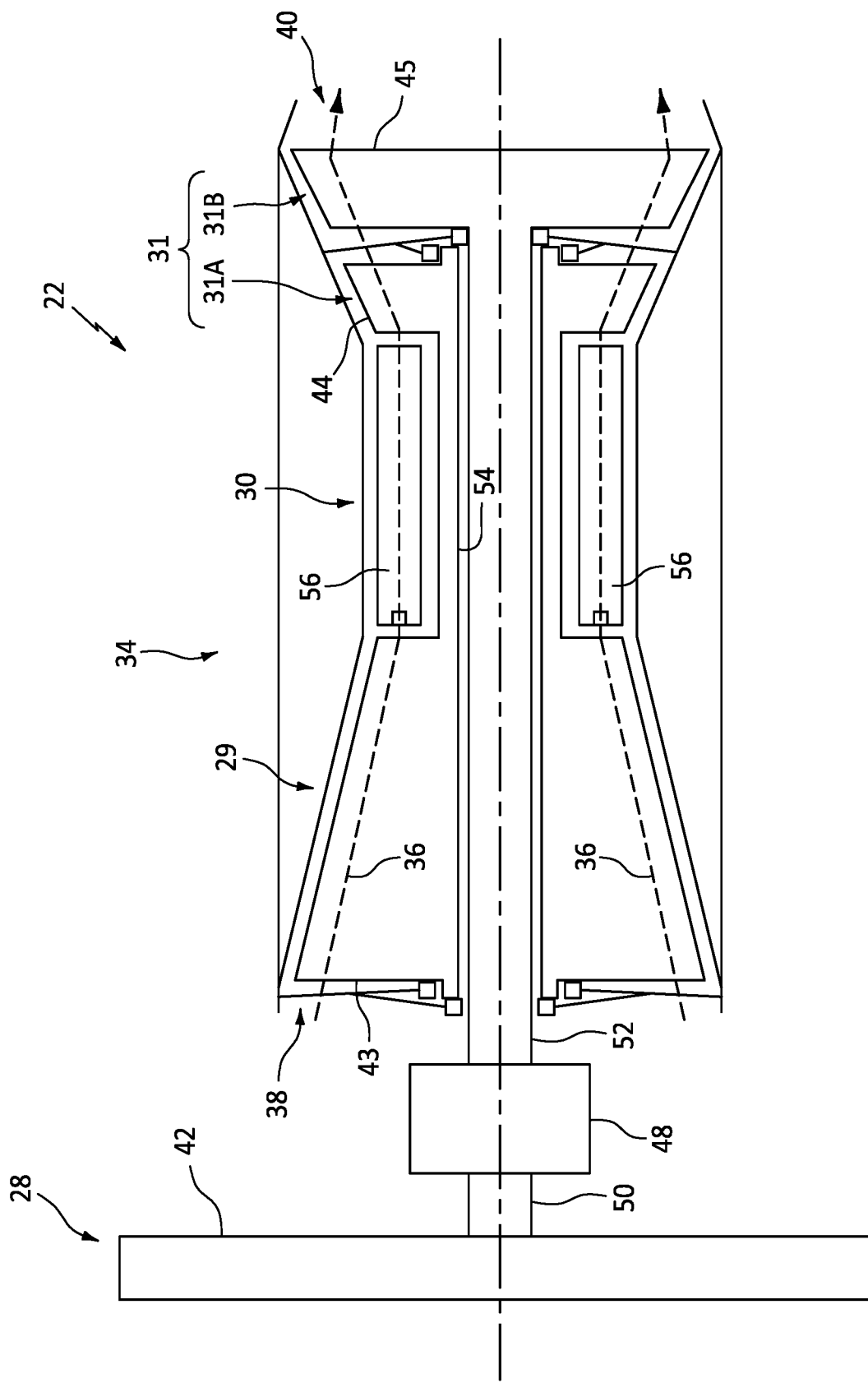
FIG. 2 is a side schematic illustration of an engine for the aircraft propulsion system.

Referring to FIG. 2, the engine 22 may be configured as an open rotor gas turbine engine such as a turboprop gas turbine engine. The engine 22 of FIG. 2, for example, includes a propeller section 28, a compressor section 29, a combustor section 30 and a turbine section 31. The turbine section 31 may include a high pressure turbine (HPT) section 31A and a low pressure turbine (LPT) section 31B; e.g., a power turbine section. A core 34 of the engine 22 includes the compressor section 29, the combustor section 30, the HPT section 31A and the LPT section 31B.

The engine sections 29-31B are arranged sequentially along a core flowpath 36 within the engine core 34. This core flowpath 36 extends within the engine core 34 from an upstream airflow inlet 38 into the engine core 34 to a downstream combustion products exhaust 40 from the engine core 34. Here, the airflow inlet 38 is also an airflow inlet into the engine 22 and the exhaust 40 is also a combustion products exhaust from the engine 22; however, the present disclosure is not limited to such an exemplary arrangement.

Each of the engine sections 28, 29, 31A and 31B includes a respective bladed rotor 42-45. Each of these bladed rotors 42-45 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The propeller rotor 42 is connected to a geartrain 48 through a propulsor shaft 50. The geartrain 48 is connected to and driven by the LPT rotor 45 through a low speed shaft 52. The compressor rotor 43 is connected to and driven by the HPT rotor 44 through a high speed shaft 54.

During engine operation, air enters the engine core 34 through the airflow inlet 38 and is directed into the core flowpath 36. The air within the core flowpath 36 may be referred to as "core air". This core air is compressed by the compressor rotor 43 and directed into a combustion chamber 56 of a combustor in the combustor section 30. Fuel is injected into the combustion chamber 56 through one or more fuel injectors and mixed with the compressor core air to provide a fuel-air mixture. This fuel-air mixture is ignited and combustion products thereof flow through and sequentially cause the HPT rotor 44 and the LPT rotor 45 to rotate. The rotation of the HPT rotor 44 drives rotation of the compressor rotor 43 and, thus, compression of the air received from the airflow inlet 38. The rotation of the LPT rotor 45 drives rotation of the propeller rotor 42. The rotation of the propeller rotor 42 generates forward aircraft thrust by propelling additional air (e.g., outside of the engine core 34 and the nacelle 26 of FIG. 1) in an aft direction.

The engine 22 is described above as the turboprop gas turbine engine for ease of description. The present disclosure, however, is not limited to such an exemplary engine. The engine 22, for example, may alternatively be configured as another type of open rotor gas turbine engine, or alternatively a ducted gas turbine engine such as a turbofan or turbojet gas turbine engine. Furthermore, it is also contemplated the engine core 34 may be replaced with another engine powerplant such as, but not limited to, a reciprocating piston engine, a rotary engine or another type of internal combustion engine.

Referring to FIG. 1, the duct assembly 24 includes an inlet nose lip 58 of the nacelle 26, the fiber-reinforced composite duct structure 60 and a downstream bypass duct 62. The nose lip 58 is configured to form an airflow inlet 64 into the aircraft propulsion system 20 and its duct assembly 24. The nose lip 58 of FIG. 1 is arranged at (e.g., on, adjacent or proximate) a forward end of the nacelle 26. This nose lip 58 may be vertically below (e.g., relative to gravity) and aft/downstream of the propeller rotor hub. The nose lip 58 of the present disclosure, however, is not limited to such an exemplary relative position to the propeller rotor 42.

Figure 3:
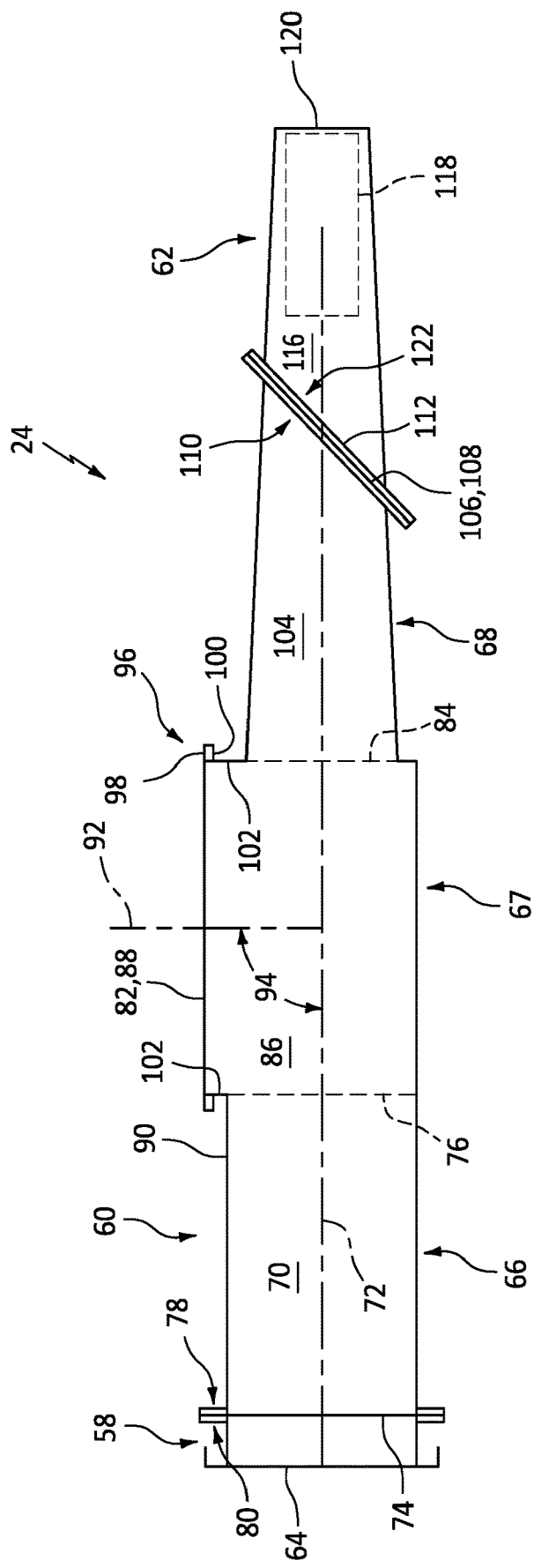
FIG. 3 is a side schematic illustration of a duct assembly for the aircraft propulsion system.
Figure 4:
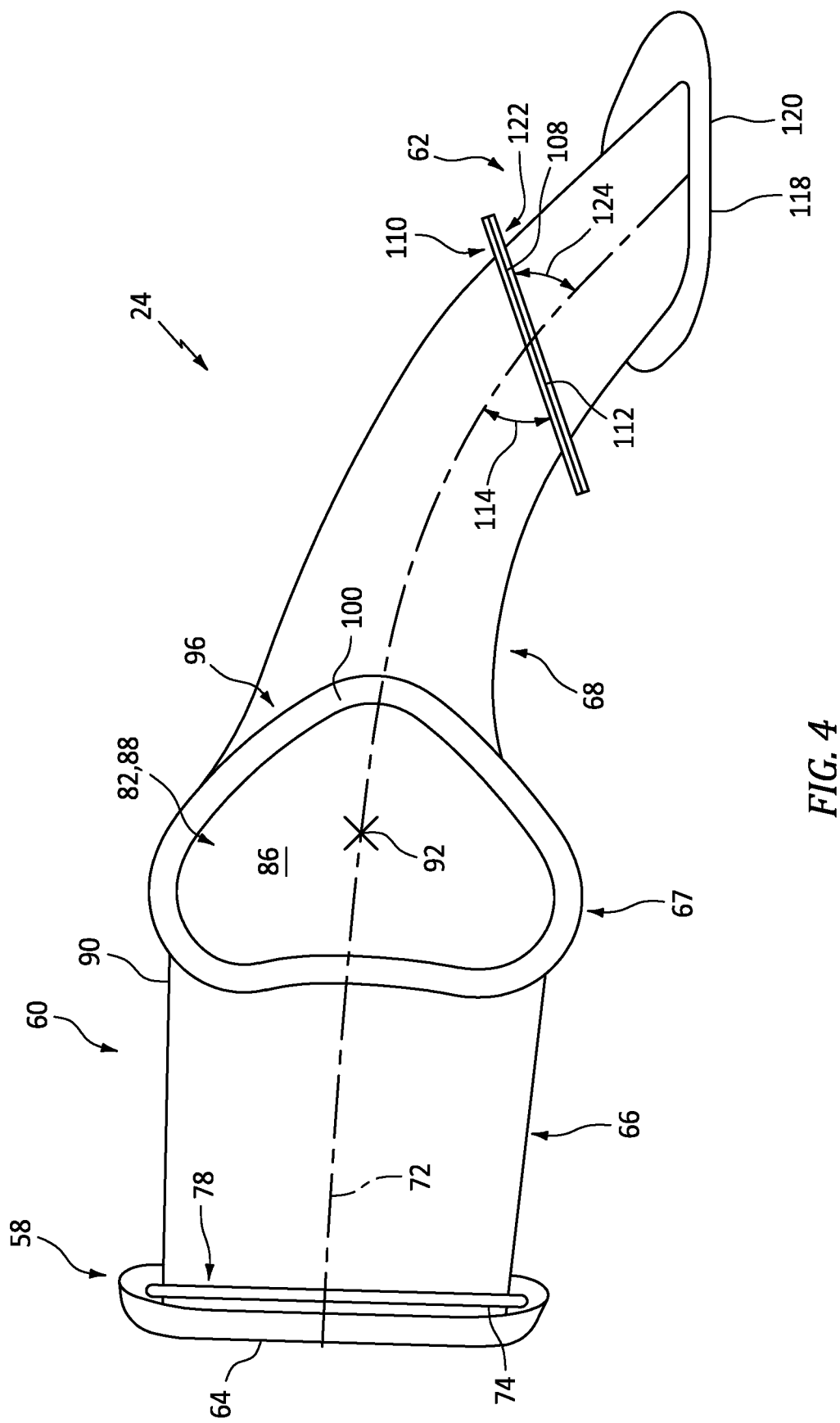
FIG. 4 is a top view schematic illustration of the duct assembly.

Referring to FIGS. 3 and 4, the duct structure 60 includes an inlet duct 66, a transition duct 67 and an upstream bypass duct 68. This duct structure 60 may be configured as a monolithic body. The duct structure members (e.g., the ducts 66-68), for example, may be molded and/or otherwise formed integral together to configure the duct structure 60 as a single, unitary body. By contrast, a non-monolithic body may include a plurality of bodies which are discretely formed and subsequently (e.g., mechanically) fastened or welded to one another. By forming the duct structure 60 as the monolithic body, an overall weight and/or complexity of the duct structure 60 may be reduced.

The duct structure 60 may be constructed from or otherwise include a polymer material. This polymer material is structurally reinforced with fiber reinforcement. The fiber reinforcement, for example, may be embedded within a matrix of the polymer material. The polymer material may be a thermoplastic such as, but not limited to, polyether ether ketone (PEEK), polyaryletherketone (PAEK), polyether ketone ketone (PEKK) or polyphenylene sulfide (PPS). The polymer material may alternatively be a thermoset such as, but not limited to, epoxy or toughened epoxy. The fiber reinforcement may be or otherwise include fiberglass fibers, carbon fibers, aramid (e.g., Kevlar®) fibers, or some combination therewith. The present disclosure, however, is not limited to the foregoing exemplary duct structure materials.

The inlet duct 66 of FIG. 3 has an internal flowpath 70; e.g., a bore. The inlet duct 66 and is flowpath 70 extend longitudinally along a longitudinal centerline 72 (e.g., of the inlet duct 66 and/or its flowpath 70) from a forward, upstream end 74 of the duct structure 60 to an inlet 76 of and into the transition duct 67. At least a portion or an entirety of the longitudinal centerline 72 along the inlet duct 66 may follow a straight trajectory when viewed, for example, in one or more reference planes; e.g., plane of FIG. 3, plane of FIG. 4. The present disclosure, however, is not limited to such an exemplary arrangement. For example, in other embodiments, at least a portion or the entirety of the longitudinal centerline 72 along the inlet duct 66 may follow a non-straight trajectory (e.g., a curved trajectory, a splined trajectory, etc.) in one or more of the references planes.

The inlet duct 66 of FIG. 3 is attached to the nose lip 58 at the structure upstream end 74. The duct structure 60, for example, may include an inlet duct flange 78 (or any other type of mount) at the structure upstream end 74. This inlet duct flange 78 projects outward from (e.g., in a direction away from the longitudinal centerline 72) the inlet duct 66 to a distal outer end of the inlet duct flange 78. The inlet duct flange 78 extends longitudinally along the longitudinal centerline 72 (and the inlet duct 66) between opposing longitudinal sides of the inlet duct flange 78, one of which inlet duct flange sides may be on (or towards) the structure upstream end 74. The inlet duct flange 78 extends circumferentially about (e.g., completely around) the inlet duct 66. The inlet duct flange 78 may thereby be an annular (e.g., full hoop) mounting flange for the inlet duct 66. This inlet duct flange 78 of FIG. 3 may longitudinally engage (e.g., be abutted against) a flange 80 on the nose lip 58, and the flanges 78 and 80 may be connected by one or more fasteners; e.g., bolts and nuts. With this arrangement, the inlet duct 66 and its flowpath 70 are fluidly coupled with, and downstream of, the airflow inlet 64 formed by the nose lip 58 at the structure upstream end 74.

Referring to FIGS. 3 and 4, the transition duct 67 may be configured as a manifold and/or a flow splitter for the duct structure 60. The transition duct 67 of FIG. 3, for example, includes the transition duct inlet 76, a first outlet 82 (e.g., an engine outlet), a second outlet 84 (e.g., a bypass outlet) and an internal flowpath 86; e.g., a bore.

The transition duct 67 and its flowpath 86 extend longitudinally along the longitudinal centerline 72 (e.g., of the transition duct 67 and/or its flowpath 86) from the transition duct inlet 76 to the transition duct second outlet 84. At least a portion or an entirety of the longitudinal centerline 72 along the transition duct 67 may follow a straight trajectory when viewed, for example, in one or more the reference planes. The present disclosure, however, is not limited to such an exemplary arrangement. For example, in other embodiments, at least a portion or the entirety of the longitudinal centerline 72 along the transition duct 67 may follow a non-straight trajectory (e.g., a curved trajectory, a splined trajectory, etc.) in one or more of the references planes.

The transition duct first outlet 82 is arranged longitudinally along the longitudinal centerline 72 between the transition duct inlet 76 and the transition duct second outlet 84. The transition duct first outlet 82, for example, may be a port 88 formed by and/or in a sidewall 90 of the duct structure 60. With this arrangement, the transition duct first outlet 82 and the transition duct second outlet 84 are fluidly coupled in parallel with, and downstream of, the transition duct inlet 76 through the transition duct flowpath 86.

The transition duct first outlet 82 and its port 88 extend along a centerline axis 92 of the transition duct first outlet 82 through the structure sidewall 90 to the transition duct flowpath 86. The first outlet centerline axis 92 is angularly offset from the longitudinal centerline 72 by an included angle 94 when viewed, for example, in the first reference plane (e.g., the plane of FIG. 3). The included angle 94 may be a non-zero acute angle or a right angle. The included angle 94, for example, may be between thirty-five degrees and ninety degrees.

The transition duct first outlet 82 is arranged with a transition duct flange 96 or any other type of mount. This transition duct flange 96 is configured to facilitate connecting the duct structure 60 and its transition duct 67 to the engine 22 and its airflow inlet 38 (see FIG. 1). The transition duct flange 96 of FIG. 3 is connected to the transition duct 67 and projects outward from (e.g., in a direction away from the centerline axis 92) the transition duct first outlet 82 and its port 88 to a distal end of the transition duct flange 96. The transition duct flange 96 extends axially along the centerline axis 92 between opposing axial sides 98 and 100 of the transition duct flange 96. The transition duct flange 96 extends circumferentially about (e.g., completely around) the transition duct first outlet 82 and its port 88. The transition duct flange 96 may thereby be an annular (e.g., full hoop) mounting flange for the transition duct 67. In some embodiments, the duct structure 60 may include a tubular (or arcuate) extension 102 between the transition duct 67 and the transition duct flange 96. This extension 102 may form the transition duct first outlet 82. The extension 102 may also facilitate spacing the transition duct flange 96 (e.g., slightly) axially away from the structure sidewall 90 along the centerline axis 92.

Referring to FIGS. 5A-C, each of the transition duct ports 76, 82 and 84 (e.g., orifices) has a cross-sectional area (schematically shown). The inlet cross-sectional area is sized greater than the first outlet cross-sectional area and the second outlet cross-sectional area. The inlet cross-sectional area, for example, may be exactly equal to or approximately equal to (e.g., within +/−2% of) a sum of the first outlet cross-sectional area and the second outlet cross-sectional area. The first outlet cross-sectional area, however, may be sized greater than the second outlet cross-sectional area. The first outlet cross-sectional area, for example, may be between one and one-half times (1.5×) and five or ten times (5×, 10×) the second outlet cross-sectional area. The transition duct 67 may thereby be configured to direct a majority of fluid received from the inlet duct 66 to the transition duct first outlet 82 over the transition duct second outlet 84. The present disclosure, however, is not limited to the foregoing exemplary dimensional relationships.

The upstream bypass duct 68 of FIG. 3 has an internal flowpath 104; e.g., a bore. The upstream bypass duct 68 and its flowpath 104 extend longitudinally along the longitudinal centerline 72 (e.g., of the upstream bypass duct 68 and/or its flowpath 104) from the transition duct second outlet 84 to an outlet 106 of the upstream bypass duct 68 and its flowpath 104 at a distal end 108 of the upstream bypass duct 68. Referring to FIG. 4, at least a portion or an entirety of the longitudinal centerline 72 along the upstream bypass duct 68 may follow a non-straight (e.g., curved, splined, bent, etc.) trajectory when viewed, for example, in the second reference plane; e.g., the plane of FIG. 4. The present disclosure, however, is not limited to such an exemplary arrangement.

The upstream bypass duct 68 is arranged with an upstream bypass duct flange 110 or any other type of mount. This upstream bypass duct flange 110 is configured to facilitate connecting the duct structure 60 and its upstream bypass duct 68 to the downstream bypass duct 62. This upstream bypass duct flange 110 projects outward from (e.g., in a direction away from the longitudinal centerline 72) the upstream bypass duct 68 to a distal outer end of the upstream bypass duct flange 110. The upstream bypass duct flange 110 extends longitudinally along the longitudinal centerline 72 (and the upstream bypass duct 68) between opposing longitudinal sides of the upstream bypass duct flange 110, one of which upstream bypass duct flange sides may be on (or towards) the upstream bypass duct end 108. The upstream bypass duct flange 110 extends circumferentially about (e.g., completely around) the upstream bypass duct 68. The upstream bypass duct flange 110 may thereby be an annular (e.g., full hoop) mounting flange for the upstream bypass duct 68.

A face plane 112 formed by the upstream bypass duct 68 and/or the upstream bypass duct flange 110 at its distal end 108 may be angularly offset from the longitudinal centerline 72. The upstream bypass duct face plane 112 of FIG. 4, for example, is angularly offset from the longitudinal centerline 72 by an included angle 114. This included angle 114 may be a non-zero acute angle. The included angle 114, for example, may be between fifteen degrees and thirty degrees, between thirty degrees and sixty degrees (e.g., forty-five degrees), or between sixty degrees and seventy-five or eighty degrees. The present disclosure, however, is not limited to the foregoing exemplary included angles.

Referring to FIG. 3, the downstream bypass duct 62 has an internal flowpath 116; e.g., a bore. The upstream bypass duct 68 and its flowpath 116 extend longitudinally along the longitudinal centerline 72 (e.g., of the downstream bypass duct 62 and/or its flowpath 116) from the upstream bypass duct 68 and its outlet 106/distal end 108 to a bypass exhaust 118 from the aircraft propulsion system 20 (see FIG. 1) and its duct assembly 24 at a downstream end 120 of the downstream bypass duct 62. At least a portion or an entirety of the longitudinal centerline 72 along the downstream bypass duct 62 may follow a straight trajectory when viewed, for example, in one or more of the reference planes; e.g., plane of FIG. 3, plane of FIG. 4. The present disclosure, however, is not limited to such an exemplary arrangement. For example, in other embodiments, at least a portion or the entirety of the longitudinal centerline 72 along the downstream bypass duct 62 may follow a non-straight trajectory (e.g., a curved trajectory, a splined trajectory, etc.) in one or more of the references planes.

The downstream bypass duct 62 is arranged with a downstream bypass duct flange 122 or any other type of mount. This downstream bypass duct flange 122 is configured to facilitate connecting the downstream bypass duct 62 to the duct structure 60 and its upstream bypass duct 68. The downstream bypass duct flange 122 of FIG. 3, for example, may longitudinally engage (e.g., be abutted against) the upstream bypass duct flange 110, and the flanges 110 and 122 may be connected by one or more fasteners (e.g., bolts and nuts) or pressed against one another without fasteners (e.g., through a gasket). With this arrangement, the downstream bypass duct 62 is fluidly coupled with the duct structure 60 and its upstream bypass duct 68 at a duct interface. The bypass duct interface of FIG. 4 has a coupling plane corresponding to the face plane 112 of the bypass duct end 108. More particularly, the coupling plane of FIG. 4 is angularly offset from the longitudinal centerline 72 by an included angle 124. This included angle 124 may be equal to (or otherwise selected based on) the included angle 114 of the upstream bypass duct face plane 112.

Referring to FIG. 1, with the foregoing configuration, the duct assembly 24 is configured to receive (e.g., ingest) ambient air through the nose lip 58 from an environment 126 external (e.g., outside of, surrounding, etc.) the aircraft propulsion system 20; e.g., an external ambient environment. The duct assembly 24 and its duct structure 60 are configured to direct some of the ambient air to the engine 22 and its airflow inlet 38 through the transition duct first outlet 82 to supply (e.g., all or at least some) of the core air. The duct assembly 24 is also configured to bypass some of the ambient air from the engine 22 and its core flowpath 36 into the bypass ducts 68 and 62. More particularly, the duct assembly 24 may be configured such that any, substantially all or at least some debris (e.g., foreign object debris (FOD)) which enters the duct assembly 24 with the ambient air through the nose lip 58 is carried with the bypass air and exhausted from the aircraft propulsion system 20 through the bypass exhaust without entering the engine 22 and its core flowpath 36. It is contemplated, of course, the bypass air flowing through the bypass ducts 68 and 62 may also or alternatively be used for various other purposes.

Figure 6:
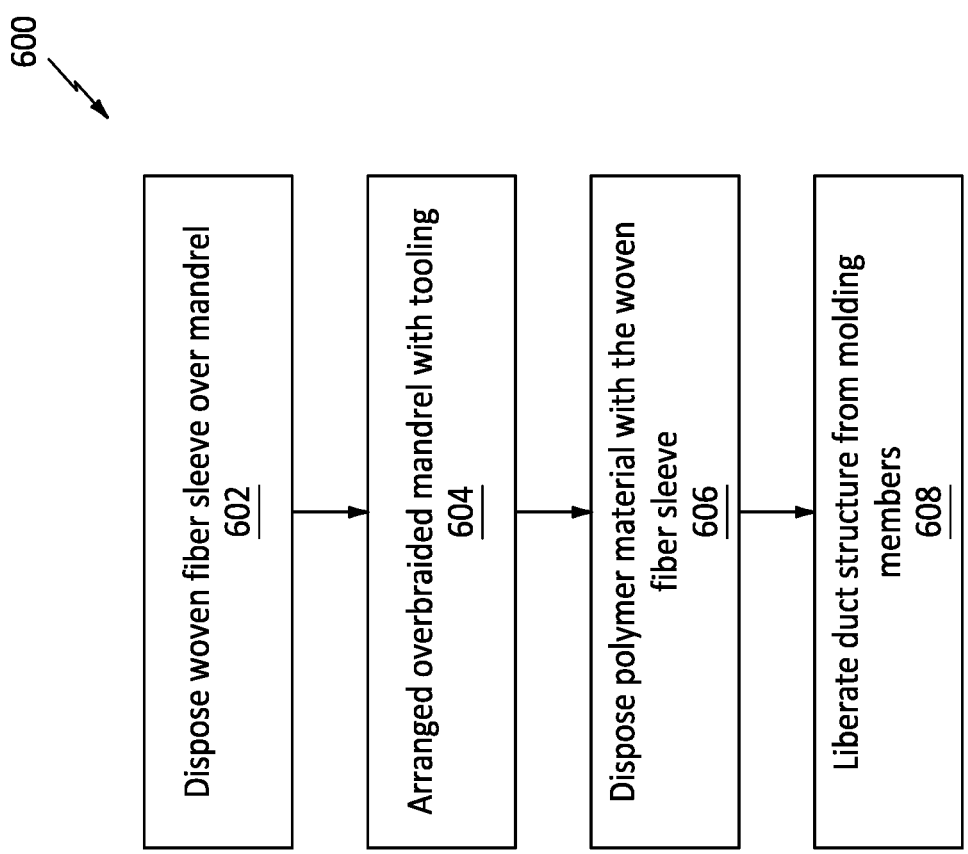
FIG. 6 is a flow diagram of a method for manufacturing a duct structure.

FIG. 6 is a flow diagram of a method 600 for manufacturing a duct structure. For ease of description, the manufacturing method 600 of FIG. 6 is described with reference to the duct structure 60 of FIGS. 1-5C. The manufacturing method 600 of the present disclosure, however, is not limited to manufacturing such an exemplary duct structure.

In step 602, referring to FIGS. 7A-D, a woven fiber sleeve 128 is disposed over a mandrel 130 to provide an overbraided mandrel 132. Referring to FIG. 8, the woven fiber sleeve 128 may be configured as a circumferentially continuous tubular sleeve formed (e.g., woven) from the fiber reinforcement. The woven fiber sleeve 128 of FIG. 8, for example, is configured as a braided sleeve of the fiber reinforcement; e.g., carbon fiber braided sleeve, fiberglass braided sleeve, aramid fiber braided sleeve or the like. Various patterns may be used for weaving (e.g., braiding) the fiber reinforcement to form the woven fiber sleeve 128, and the present disclosure is not limited to any particular ones thereof.

Figure 7A:
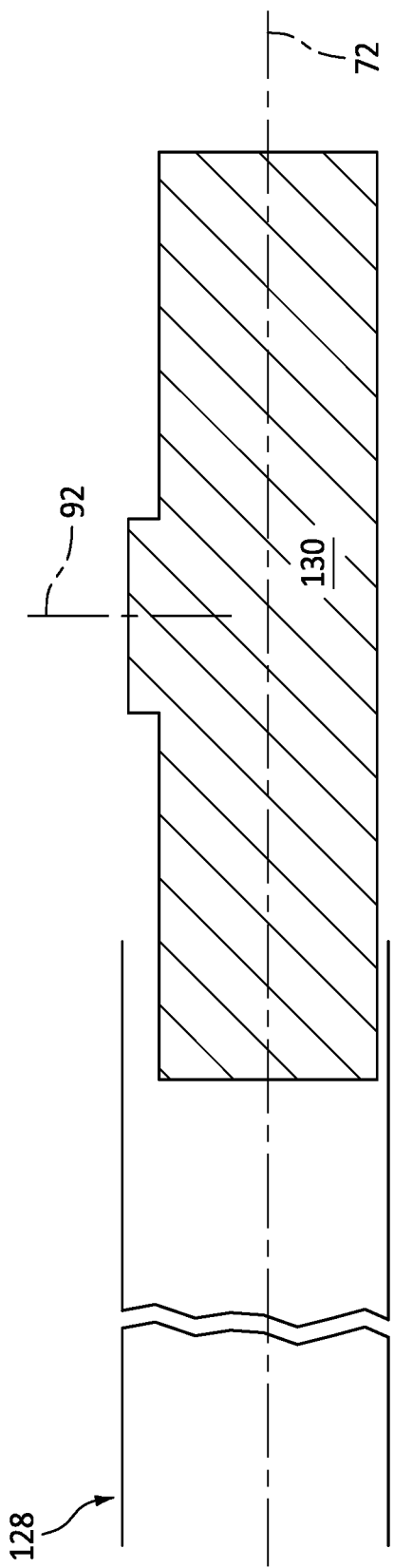
FIGS. 7A-7D are sectional illustrations of various steps to provide a mandrel overbraided with a woven fiber sleeve.
Figure 7B:
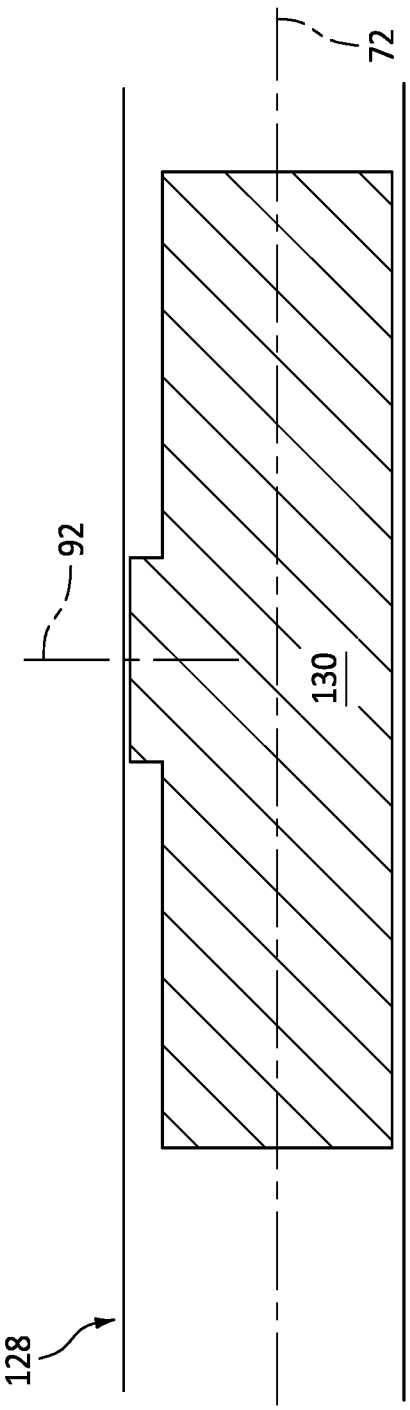
Figure 8:
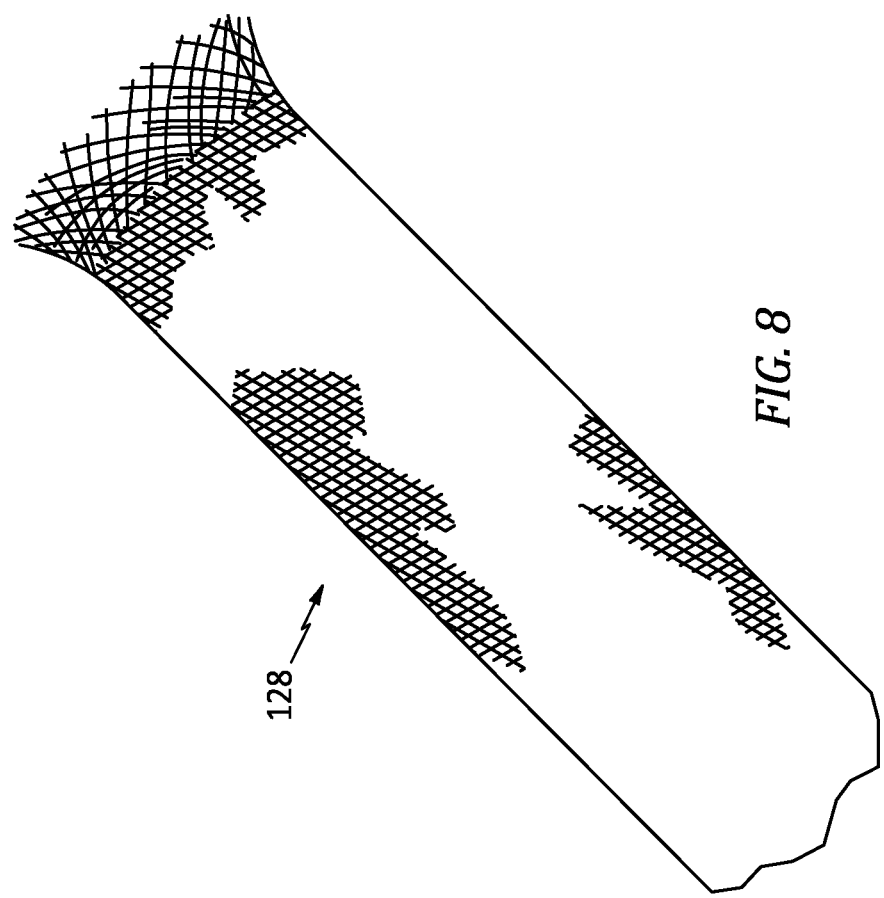
FIG. 8 is a perspective illustration of a portion of the woven fiver sleeve.

Referring to FIG. 7A, during the disposing step 602, the woven fiber sleeve 128 may be slipped longitudinally onto an end of the mandrel 130. The mandrel 130 may thereby project longitudinally into an open end of the woven fiber sleeve 128. Referring to FIG. 7B, the woven fiber sleeve 128 may then be pulled along and (e.g., completely) onto the mandrel 130 such that, for example, an entire (or substantial) longitudinal length of the mandrel 130 is covered and overlapped by the woven fiber sleeve 128.

Figure 7C:
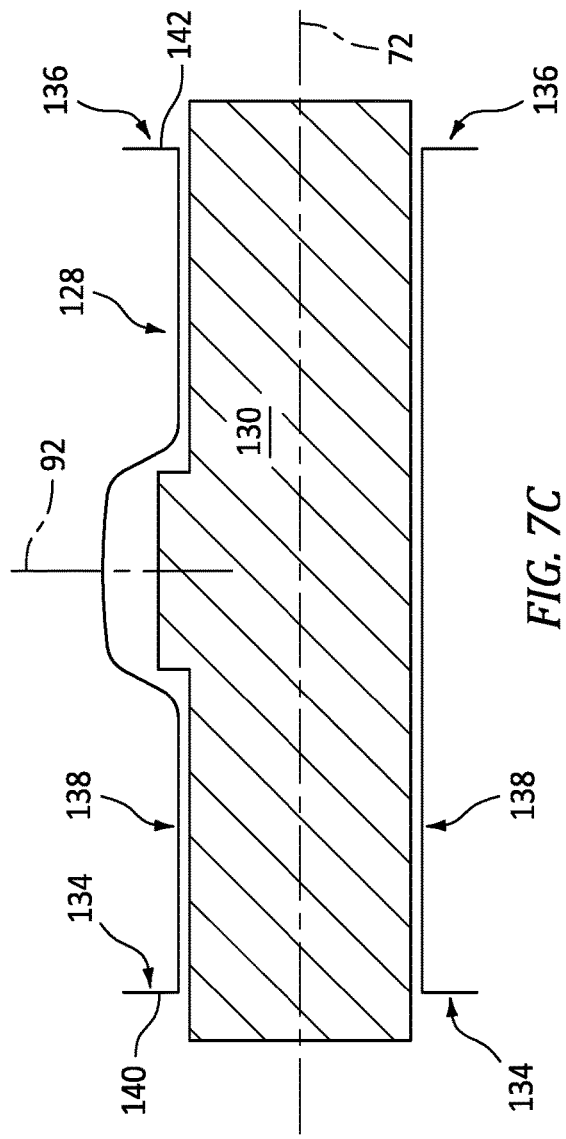

Referring to FIG. 7C, one or more end portions of the woven fiber sleeve 128 are manipulated to provide the woven fiber sleeve 128 with respective end mount sections 134 and 136. Each end portion of the woven fiber sleeve 128, for example, may be flared outward from a base section 138 of the woven fiber sleeve 128. More particularly, the fiber reinforcement at each end portion of the woven fiber sleeve 128 may be splayed or otherwise spread apart (e.g., without requiring cutting of the woven fiber sleeve 128) to respectively form the end mount sections 134 and 136. Each of these end mount sections 134, 136 projects out from and circumscribes the base section 138. Here, the base section 138 is wrapped circumferentially around the mandrel 130 and extends longitudinally along the mandrel 130 between and to opposing longitudinal ends 140 and 142 of, for example, the overbraided material (and/or the mandrel 130).

Figure 7D:
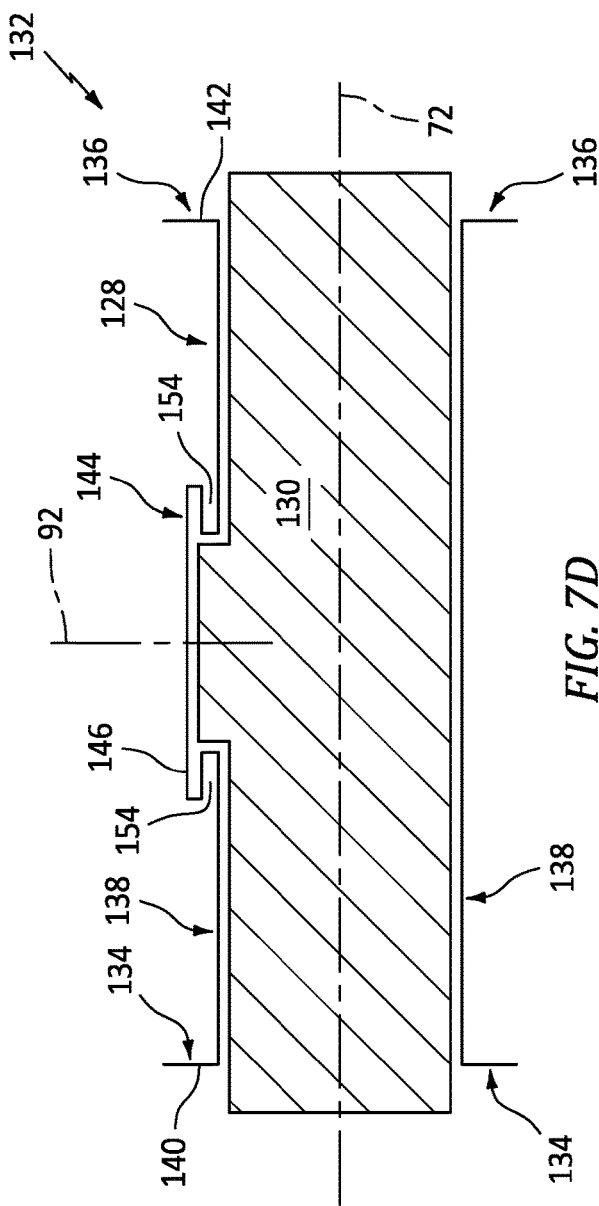

Referring to FIG. 7D, an intermediate portion of the woven fiber sleeve 128 is manipulated to provide the woven fiber sleeve 128 with an intermediate mount section 144. This intermediate mount section 144 is disposed longitudinally at an intermediate location between the ends 140 and 142. To form the intermediate mount section 144, referring to FIG. 7C, the intermediate portion of the woven fiber sleeve 128 may be pulled out and away from the mandrel 130. Referring to FIG. 7D, the intermediate portion of the woven fiber sleeve 128 may then be draped to form the intermediate mount section 144. Here, the intermediate mount section 144 projects out from the base section 138. The intermediate mount section 144 also forms an annular overhang 146 that overlaps an adjacent portion of the base section 138.

During the provision of the overbraided mandrel 132 of FIG. 7D, the woven fiber sleeve 128 may be manipulated to first form one or more of the end mount sections 134 and 136 and then form the intermediate mount section 144. Alternatively, the woven fiber sleeve 128 may be manipulated to first form the intermediate mount section 144 and then form one or more of the end mount sections 134 and 136. Still alternatively, the woven fiber sleeve 128 may be manipulated to concurrently form any two or more (e.g., all) of the mount sections 134, 136 and/or 144.

Figure 9:
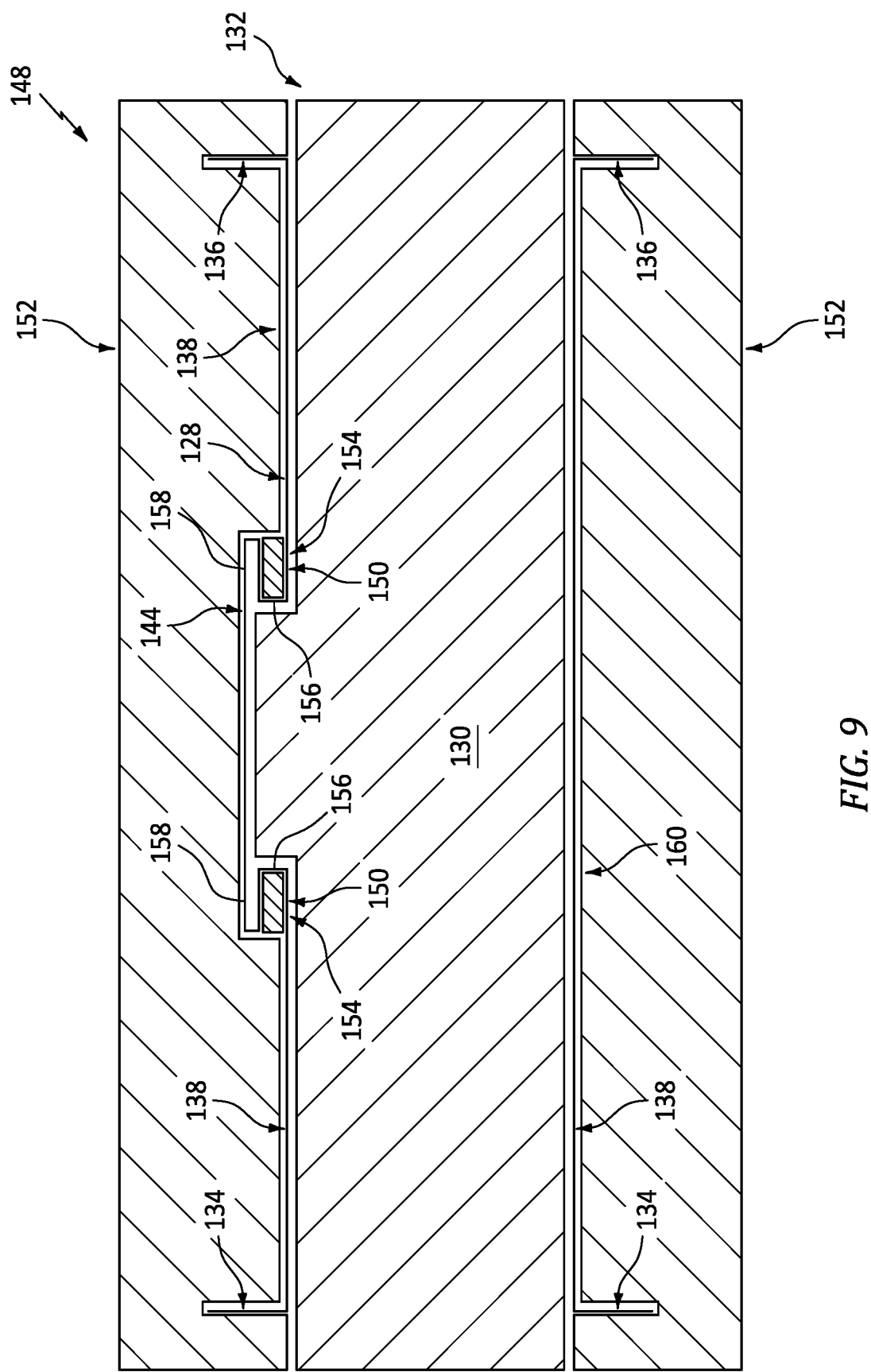
FIG. 9 is a sectional illustration of the overbraided mandrel arranged with tooling.

In step 604, referring to FIG. 9, the overbraided mandrel 132 is arranged with tooling 148. This tooling 148 may include an annular insert 150 and an exterior mold 152.

Figure 10:
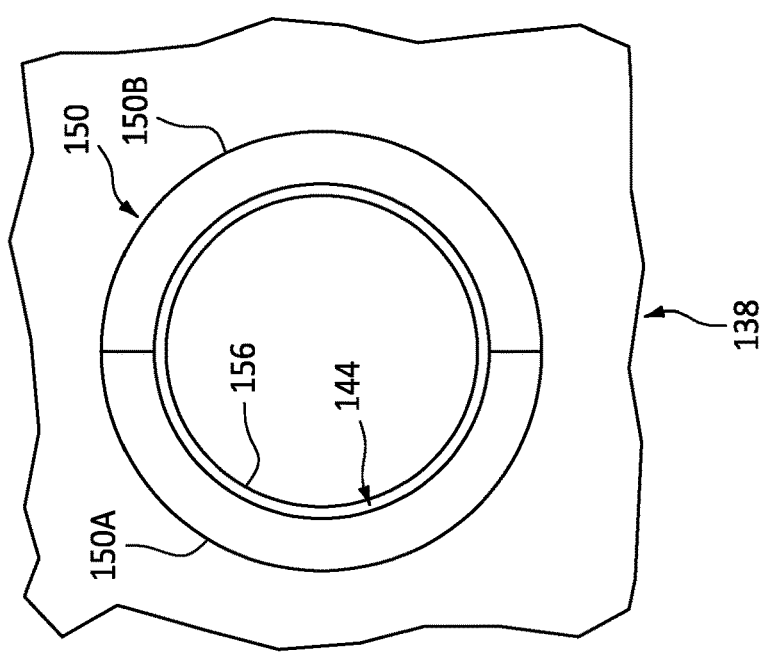
FIG. 10 is a cutaway illustration of a portion of the overbraided mandrel arranged with an annular insert.

The annular insert 150 is inserted into an annular gap 154 (see also FIG. 7D) (e.g., channel, groove, etc.) between the intermediate mount section 144 and the base section 138. The annular insert 150 of FIG. 9 circumscribes a (e.g., annular or tubular) port portion 156 of the intermediate mount section 144 which connects a (e.g., annular) flange portion 158 of the intermediate mount section 144 to the base section 138. The annular insert 150 is further disposed between the flange portion 158 and the base section 138, thereby at least partially or completely filling the annular gap 154. Referring to FIG. 10, to facilitate arrangement of the annular insert 150 with the overbraided material, the annular insert 150 may have a segmented body. The annular insert 150, for example, may be formed from two separable halves 150A and 150B.

Figure 11:
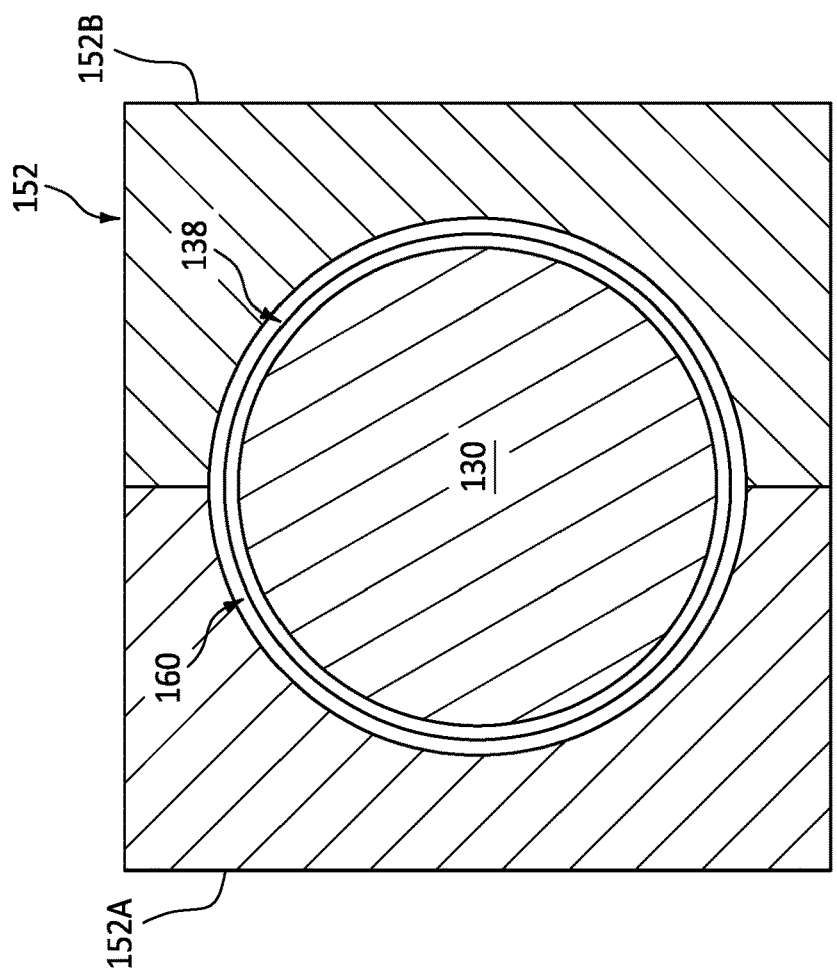
FIG. 11 is a sectional illustration of a portion of the overbraided mandrel arranged with the tooling.

The overbraided mandrel 132 with the annular insert 150 of FIG. 9 are disposed within an internal cavity 160 of the exterior mold 152. The exterior mold 152 may thereby substantially or completely overlap and circumscribe an exterior of the overbraided material. Referring to FIG. 11, to facilitate arrangement of the overbraided mandrel 132 into the internal cavity 160, the exterior mold 152 may have a segmented body. The exterior mold 152, for example, may be formed from two separable halves 152A and 152B.

In step 606, the polymer material is disposed with the woven fiber sleeve 128 to provide the duct structure 60. The polymer material, for example, may be infused into the fiber reinforcement of the woven fiber sleeve 128 following the provision of the mount sections 134, 136 and 144. The polymer material may be infused, for example, following (or during) the step 604. Liquid polymer material, for example, may be injected into the exterior mold 152 until the fiber reinforcement of the woven fiber sleeve 128 is embedded within a matrix of the polymer material. The polymer material may then be set (e.g., solidified) under pressure between the molding members 130, 150 and 152.

In step 608, the molding members 130, 150 and 152 are removed to liberate the formed duct structure 60.

One or more of the ducts 66-68 may be partially or completely formed by the base section 138 of the woven fiber sleeve 128 (embedded in or otherwise infused with the polymer material). The inlet duct flange 78 may be partially or completely formed by the inlet end mount section 134 (embedded in or otherwise infused with the polymer material). The upstream bypass duct flange 110 may be partially or completely formed by the outlet end mount section 136 (embedded in or otherwise infused with the polymer material). The transition duct flange 96 may be partially or completely formed by the intermediate mount section 144 (embedded in or otherwise infused with the polymer material). More particularly, the transition duct first outlet 82 and its port 88 may be formed from the port portion 156 of the intermediate mount section 144. The transition duct flange 96 may be formed from the flange portion 158 of the intermediate mount section 144.

Figure 12:
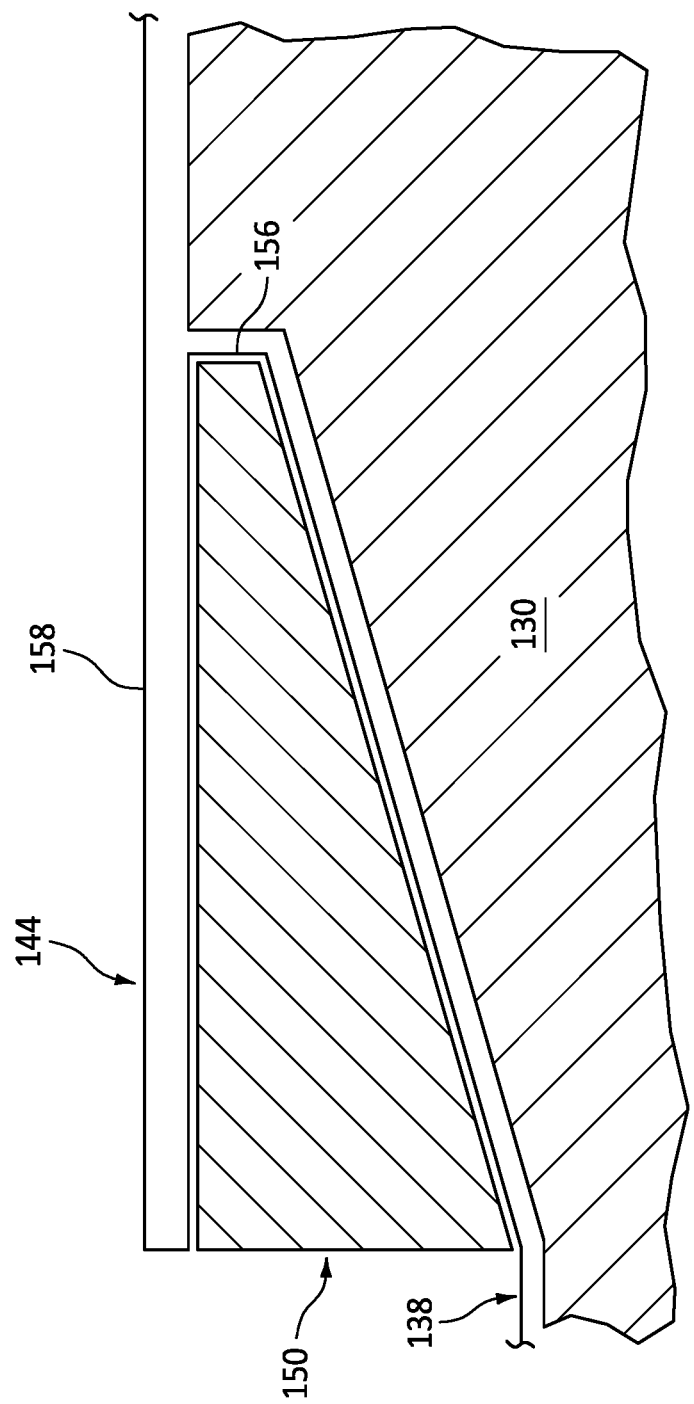
FIG. 12 is a sectional illustration of a portion of the overbraided mandrel arranged with the annular insert.

In some embodiments, referring to FIG. 12, the annular insert 150 may be configured with a tapered cross-sectional geometry when viewed, for example, in a reference plane parallel with (e.g., including) the centerline axis 92 (not visible in FIG. 12). The annular insert 150 and its cross-sectional geometry of FIG. 12, for example, tapers as the annular insert 150 extends towards the port portion 156 of the intermediate mount section 144.

In some embodiments, the mandrel 130 may be formed from a relatively compliant material to facilitate removal during the step 608. The mandrel 130, for example, may be constructed from or otherwise include thermoplastic or low melt metallic material. The mandrel may alternatively be constructed from a washout sand, where the washout sand may be removed by a dissolvable material. Of course, various other techniques may also or alternatively be employed to facilitate removal of the mandrel 130 from an interior of the duct structure 60.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for manufacturing, comprising:
disposing a woven fiber sleeve over a mandrel to provide an overbraided mandrel, the woven fiber sleeve including a base section and a mount section, the base section wrapped circumferentially around the mandrel and extending longitudinally along the mandrel between a first end and a second end, the mount section disposed longitudinally at an intermediate location between the first end and the second end, and the mount section projecting out from the base section;
arranging the overbraided mandrel with tooling, wherein the tooling includes an annular insert, the annular insert circumscribes a first portion of the mount section, the annular insert is disposed between a second portion of the mount section and the base section, and the annular insert has a cross-sectional geometry that tapers as the annular insert extends towards the first portion of the mount section; and
disposing a polymer material with the woven fiber sleeve to provide a duct structure, the duct structure including a tubular duct and an annular flange, the tubular duct formed by the base section, and the annular flange formed by the mount section.

2. The method of claim 1, wherein
a flowpath extends longitudinally within the duct structure between the first end and the second end; and
the annular flange circumscribes a port, and the port is to a side of and fluidly coupled with the flowpath.

3. The method of claim 1, wherein
the first portion of the mount section forms a port into the duct structure; and
the second portion of the mount section forms the annular flange, and the annular flange circumscribes the port.

4. The method of claim 1, wherein
the tooling comprises an exterior mold; and
the overbraided mandrel is disposed within a cavity of the exterior mold.

5. The method of claim 1, wherein
the woven fiber sleeve further includes a first end mount section disposed longitudinally at the first end;
the first end mount section projects out from the base section; and
the duct structure further includes an annular first end flange formed by the first end mount section.

6. The method of claim 5, wherein the woven fiber sleeve is flared out to provide the first end mount section.

7. The method of claim 5, wherein
the woven fiber sleeve further includes a second end mount section disposed longitudinally at the second end;
the second end mount section projects out from the base section; and
the duct structure further includes an annular second end flange formed by the second end mount section.

8. The method of claim 1, wherein the woven fiber sleeve comprises carbon fiber.

9. The method of claim 1, wherein the polymer material comprises thermoplastic material.

10. The method of claim 1, wherein the polymer material comprises of thermoset material.

11. The method of claim 1, wherein the duct structure is configured for an aircraft propulsion system.

12. The method of claim 1, wherein
the tubular duct comprises a transition duct, and the duct structure further includes an inlet duct and a bypass duct;
the transition duct includes an inlet, a first outlet and a second outlet, the transition duct extends longitudinally along a longitudinal centerline from the inlet to the second outlet, and the first outlet is arranged longitudinally along the longitudinal centerline between the inlet and the second outlet and is circumscribed by the annular flange;
the inlet duct extends longitudinally along the longitudinal centerline to the inlet; and
the bypass duct extends longitudinally along the longitudinal centerline from the second outlet.

13. The method of claim 12, wherein a centerline axis of the first outlet is angularly offset from the longitudinal centerline.

14. The method of claim 12, wherein the duct structure is configured in a monolithic body.

15. A method for manufacturing, comprising:
disposing a woven fiber sleeve over a mandrel to provide an overbraided mandrel, the woven fiber sleeve including a base section and a mount section, the base section wrapped circumferentially around the mandrel and extending longitudinally along the mandrel between a first end and a second end, the mount section disposed longitudinally at an intermediate location between the first end and the second end, and the mount section projecting out from the base section;
arranging the overbraided mandrel with tooling, wherein the tooling includes an annular insert, the annular insert circumscribes a first portion of the mount section, and the annular insert is disposed between a second portion of the mount section and the base section;
disposing a polymer material with the woven fiber sleeve to provide a duct structure, the duct structure including a tubular duct and an annular flange, the tubular duct formed by the base section, and the annular flange formed by the mount section; and
removing the tooling including the annular insert to liberate the duct structure;
wherein the annular insert has a cross-sectional geometry that tapers as the annular insert extends towards the first portion of the mount section.

* * * * *